G. M. LARSSON.
DYNAMO ELECTRIC MACHINE.
APPLICATION FILED DEC. 12, 1913.

1,244,868.

Patented Oct. 30, 1917.

WITNESSES:
Harry E. McGill
Jeremy T. Lynch

INVENTOR
GUSTAF M. LARSSON.
BY
ATTORNEY

UNITED STATES PATENT OFFICE.

GUSTAF M. LARSSON, OF NEWARK, NEW JERSEY, ASSIGNOR TO ECK DYNAMO AND MOTOR COMPANY, A CORPORATION OF NEW JERSEY.

DYNAMO-ELECTRIC MACHINE.

1,244,868.  Specification of Letters Patent.  Patented Oct. 30, 1917.

Application filed December 12, 1913. Serial No. 306,132.

*To all whom it may concern:*

Be it known that I, GUSTAF M. LARSSON, a subject of the King of Sweden, and a resident of Newark, in the county of Essex and State of New Jersey, have invented certain new and useful Improvements in Dynamo-Electric Machines, of which the following is a specification.

The present invention relates generally to dynamo-electric machines, and more particularly, though not exclusively, to the class of machines used for electric self starters in automobiles, wherein the machine runs part of the time as a generator and part of the time as a motor.

In such and other dynamo-electric machines it is desirable to employ commutating poles for the purpose of reducing sparking, and it is also advantageous under certain circumstances to have a compound field, and, in the particular case under consideration, a differentially wound field, in order that the voltage may remain constant at different speeds.

In the prior art of dynamo-electric machines it has been the practice to have a separate coil around the commutating pole in series with the armature. This requires more wire than is actually needed and more space than is usually available.

The object of the present invention is to reduce the amount of wire used in machines of this character.

To this end the invention consists of a dynamo-electric machine comprising an armature; and a field consisting of main poles and one or more commutating poles, together with a field winding in series with the armature through which a magnetic field is generated in the main poles and having a common coil surrounding one main pole and the commutating pole with a single loop.

In case it is desired to have a compound wound machine, the field will have an additional or main winding in shunt with the armature, the coils of which surround the main poles only. In that event the series winding may be considered an auxiliary winding and takes the form of a common coil surrounding one main pole and the commutating pole with a single loop.

In order to obtain the proper space for housing the coils and in order to reduce the size of the machine as much as possible, the body portion of one of the main poles, between which main poles the commutating pole is interposed, is undercut on the side circumferentially opposite to the other main pole, while said other main pole has a normal body portion circumferentially opposite to the first main pole. The faces of said main poles are nevertheless symmetrically arranged with respect to each other. Between these two main poles an interpole is located whose body portion springs from a point adjacent to the normal body portion of the second main pole but whose face portion extends toward the undercut portion of the first main pole so as to have its face substantially equidistant from the two main pole faces. By this means a greater coil space is afforded between the interpole and the undercut portion of the first main pole than between the interpole and the normal portion of the second main pole. The result is that ample room is afforded for the various coils within a very small compass.

In the accompanying drawings the invention is disclosed in a concrete and preferred form, but changes may be made within the scope of the claims without departing from the invention.

In the said drawings.

Similar characters of reference indicate corresponding parts in the several views.

Figure 1:
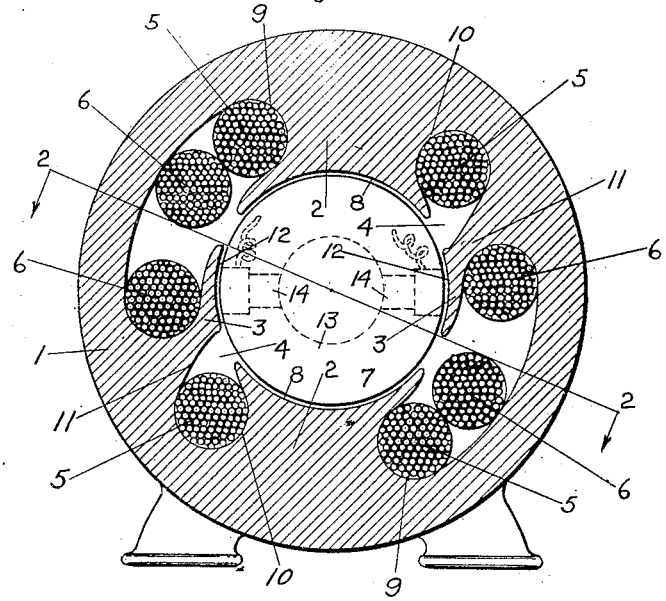
Figure 1 is a vertical sectional view of a dynamo-electric machine embodying the invention.
Figure 2:
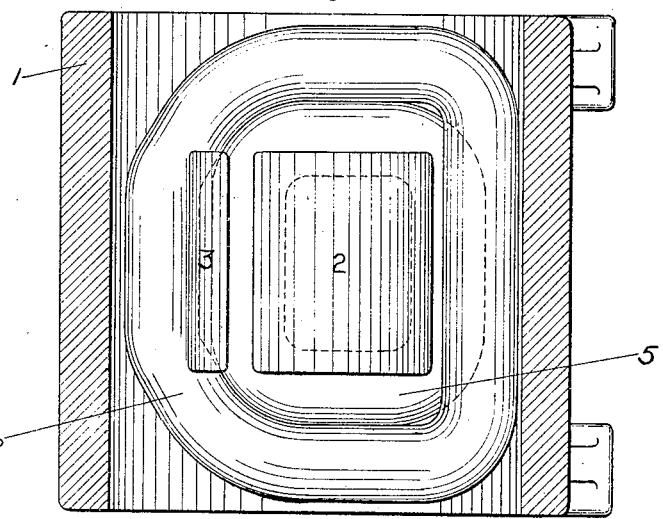
Fig. 2 is a substantially horizontal sectional view on the line 2—2 of Fig. 1.
Figure 3:
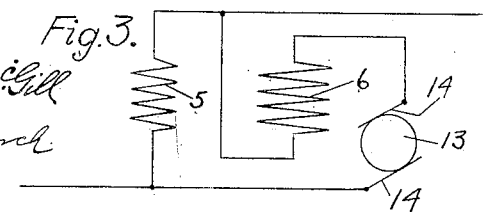
Fig. 3 shows a preferred form of wiring.

The field is preferably constructed as follows:

1 indicates a casing here shown as being provided with two main poles 2 and one or more interpoles 3, here performing the function of commutating poles. As here shown, the faces 8 of the main poles are symmetrically arranged with respect to each other, but the body portion of each main pole is undercut on one side 9, as shown, while on the other side 10 the said body portion is normal. It will be noted that the undercut portion of one main pole is disposed circumferentially opposite to the normal portion of the other main pole. The result is that the pole face of each pole appears distorted with respect to its own body portion. 3 is an interpole here serving as a commutating pole, the body portion 11 of which springs from a point adjacent to the normal body portion of one main pole and has its pole face 12 extending toward the undercut portion of the other main pole. The result is that the face of the commutating pole is substantially equidistant from the two main pole faces. In this way a greater coil space is afforded between the interpole and the undercut portion of one main pole than between the interpole and the normal portion of the other main pole. The field winding may consist of a coil 6, through which the magnetic field is generated in the main poles, which, as shown in Fig. 3, is in series with the armature indicated at 7 by means of the commutator 13 and brushes 14. This coil 6 surrounds both a main pole and the interpole. If a compound wound construction is employed, an additional coil as 5 may be employed which surrounds the main pole only and is in shunt with the armature, as indicated in Fig. 3.

The two windings 5 and 6 may be arranged electrically in various ways. One winding may reinforce the other or the two windings may oppose each other.

What is claimed, is:

1. In a dynamo-electric machine, two main poles the body portion of one of which is undercut on one side, and said other main pole having a normal body portion circumferentially opposite to the undercut side of the first main pole, the faces of said main poles being nevertheless symmetrically arranged with respect to each other, and an interpole whose body portion springs from a point adjacent to the normal body portion of the second main pole and having its pole face extending toward the undercut portion of the first main pole so as to have its face substantially equidistant from the two main pole faces, whereby a greater coil space is afforded between the interpole and the undercut portion of the first main pole than between the interpole and the normal portion of the second main pole.

2. In a dynamo-electric machine, a field member comprising: a plurality of main poles the faces of which are symmetrically arranged with respect to each other, and the body portion of each of which is normal on one side and undercut to a greater extent on the other side, so that each pole face appears distorted with respect to its own body portion, the normal portion of one main pole being arranged circumferentially opposite to the undercut portion of the other main pole, and an interpole, whose body portion springs from a point adjacent to the normal portion of one of said main poles, and having its pole face extending toward the undercut portion of the other main pole so as to have its face substantially equidistant from the two main pole faces, whereby a greater coil space is afforded between the interpole and the undercut portion of one main pole than between the interpole and the normal portion of the other main pole.

3. In a dynamo-electric machine, two main poles the body portion of one of which is undercut on one side and said other main pole having a normal body portion circumferentially opposite to the undercut side of the first main pole, the faces of said main poles being nevertheless symmetrically arranged with respect to each other, an interpole whose body portion springs from a point adjacent to the normal body portion of the second main pole and having its pole face extending toward the undercut portion of the first main pole so as to have its face substantially equidistant from the two main pole faces, whereby a greater coil space is afforded between the interpole and the undercut portion of the first main pole than between the interpole and the normal portion of the second main pole, a coil surrounding a main pole and passing between the main pole and the interpole, and a second coil surrounding both a main pole and the interpole.

4. In a dynamo-electric machine, a field member comprising: a plurality of main poles the faces of which are symmetrically arranged with respect to each other, and the body portion of each of which is normal on one side and undercut to a greater extent on the other side, so that each pole face appears distorted with respect to its own body portion, the normal portion of one main pole being arranged circumferentially opposite to the undercut portion of the other main pole, an interpole, whose body portion springs from a point adjacent to the normal portion of one of said main poles, and having its pole face extending toward the undercut portion of the other main pole so as to have its face substantially equidistant from the two main pole faces, whereby a greater coil space is afforded between the interpole and the undercut portion of one main pole than between the interpole and the normal portion of the other main pole, a coil surrounding each main pole and passing between the main and interpoles, and a second coil surrounding both a main pole and an interpole.

Signed at Belleville, in the county of Essex and State of New Jersey, this 8th day of December, A. D. 1913.

GUSTAF MAURITZ LARSSON.

Witnesses:
A. BOURGEOIS,
J. GRAN.